May 31, 1960 F. H. BRANIN, JR 2,939,077
PHASE DISCRIMINATING SYSTEM
Filed Sept. 27, 1954 3 Sheets-Sheet 1

INVENTOR:
F.H. BRANIN
BY:
HIS ATTORNEY

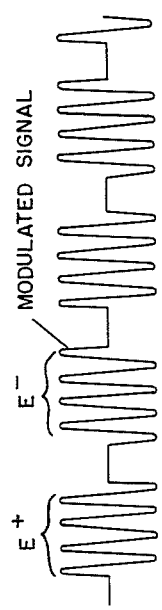
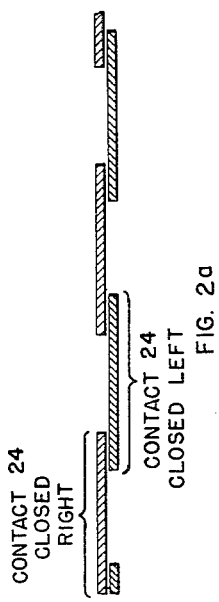
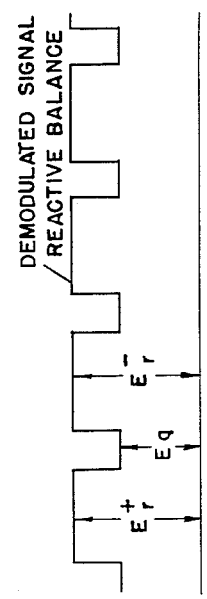
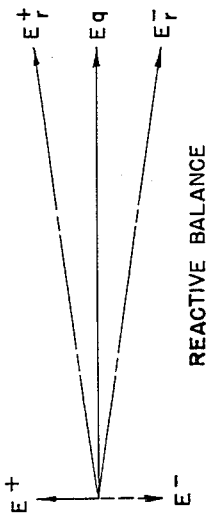
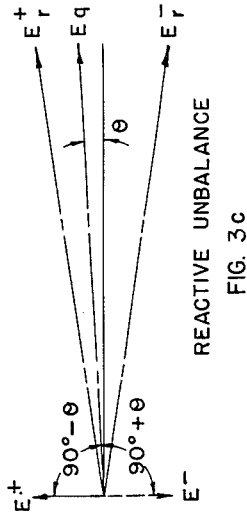
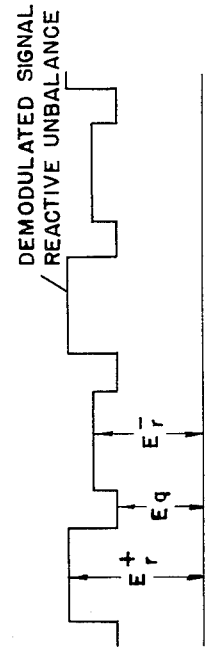

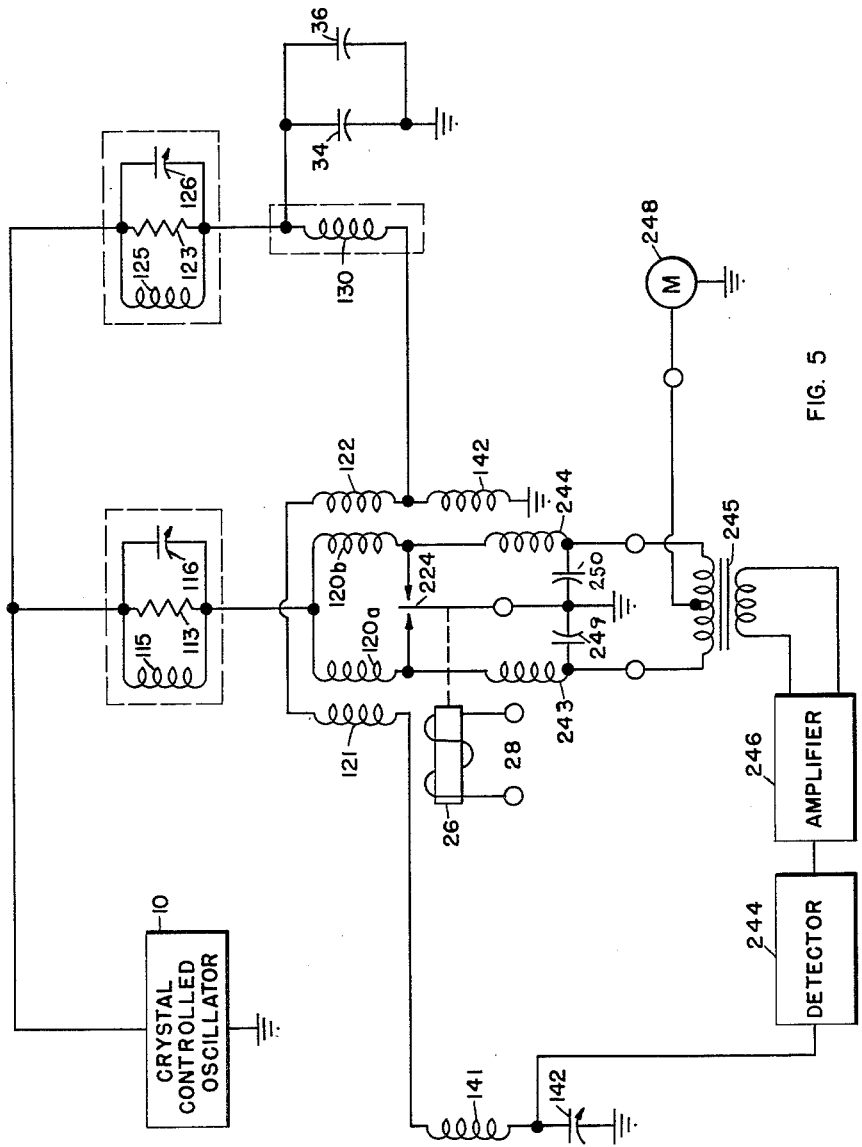

2,939,077
Patented May 31, 1960

1

2,939,077

PHASE DISCRIMINATING SYSTEM

Franklin H. Branin, Jr., Berkeley, Calif., assignor to Shell Oil Company, a corporation of Delaware Filed Sept. 27, 1954, Ser. No. 458,337

8 Claims. (Cl. 324—61)

This invention relates to phase discriminating circuits and pertains more particularly to a system for determining the condition of reactive balance (zero reactance) in a resonant circuit by comparing the relative phase of the signal in the resonant circuit with the phase of a reference signal or signals. In preferred embodiments of this invention, radio frequency signals are used, but the principle of operation is valid at any frequency.

In carrying out certain electrical measurements, for example, the measurement of dielectric constants of conductive media, it sometimes becomes necessary to determine a condition of reactive balance or resonance in a series or parallel RLC (resistance-inductance-capacitance) circuit having a low Q factor. The Q factor in a series RLC circuit is defined as the ratio of inductive or capacitive reactance to resistance, and in a parallel RLC circuit as the ratio of resistance to inductive or capacitive reactance. At resonance, the total reactance of the series or parallel RLC circuit is zero and this is the condition of reactive balance which it is desired to determine.

A conventional method of determining reactive balance or resonance in a series or parallel RLC circuit is to measure the response or amplitude of the signal in the circuit as a function of total reactance, a maximum current or voltage signal being obtained at zero total reactance. This technique, however, suffers from serious loss of sensitivity when the Q factor is small.

A second conventional method for determining reactive balance or resonance in a series or parallel RLC circuit is to use the circuit as the frequency determining element of a vacuum tube oscillator, the frequency of oscillation giving an indication of reactive balance in the circuit. This method, however, is not always applicable in the case of circuits having a small Q factor because of the difficulty of sustaining oscillations. Moreover, the method is adversely affected by changes in the vacuum tube characteristics, particularly input capacitance.

A third conventional method for determing reactive balance resonance in a series or parallel RLC circuit is the bridge method in which both the amplitude and phase of the signal in the RLC circuit are compared with the amplitude and phase of a reference signal, a null being obtained when both signals are of equal amplitude and opposite phase. Although this method is accurate even for circuits having a small Q factor, it requires a simultaneous adjustment of both phase and amplitude of the reference signal.

It is therefore the object of this invention to provide an accurate and sensitive null method for determining the condition of reactive balance or resonance in a parallel or series RLC circuit by comparing the relative phase of the signal in this circuit with the phase of a reference signal or signals, this comparison being completely independent of any amplitude balance.

It is also an object of this invention to provide an accurate and sensitive null method for determining the condition of phase balance between the phase of an unknown signal and that of a reference signal or signals.

2

It is a further object of this invention to provide an indication of the magnitude and direction of either a reactive unbalance or a phase unbalance.

It is also an object of this invention to provide a system capable of supplying an error signal indicating the magnitude and direction of either a reactive unbalance or a phase unbalance, such error signal to be employed in operating a servomechanism for automatically restoring the reactive balance or phase balance.

It is a further object of this invention to provide a means of automatically measuring and continuously recording changes in either inductive or capacitive reactance or changes in relative phase, and in particular to provide a means for automatically measuring and continuously recording the dielectric constant of various materials independently of their conductivity.

It is an object of this invention to achieve a sensitive method of phase comparison or phase discrimination by applying square wave modulation to the reference signal or signals at an audio frequency rate. It is to be understood that square wave modulation is only a preferred form of modulation, since other types of modulation might also be used. The use of square wave modulation is however preferred because the modulating means employed permits greater stability and uniformity of modulation than is otherwise obtainable.

These and other objects of the present invention will be understood from the following description given with reference to the attached drawings, wherein:

Figures 2a, 2b and 2c are diagrammatic representations of a radio frequency signal subjected to square wave modulation in accordance with the present invention;

Figures 3b and 3c are vector diagrams illustrating the phase discriminating principle of the present system with regard to wave forms shown in Figures 2b and 2c.

Figure 5 is a circuit diagram of a system for synchronously detecting output signals so as to permit direct indication on a meter of the magnitude and direction of reactive unbalance of the circuit.

Figure 1:
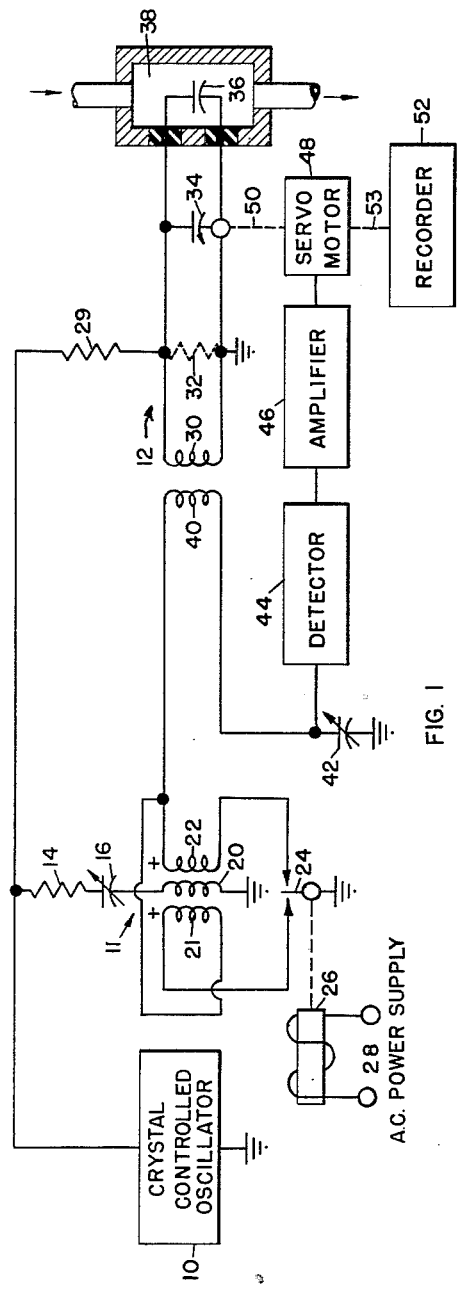
Figure 1 is a circuit diagram showing the general arrangement of the present system as applied to the measurement and recording of the dielectric constant of a fluid.

In Figure 1, a source of radio frequency oscillations, such as a crystal controlled oscillator 10, which may operate at any suitable frequency, for example from 2 to 20 megacycles, feeds its output to a branch 11, which may be designated here as the series resonant branch, and to another branch 12, which may be designated as the parallel resonant branch.

The branch 11 comprises a resistance 14 in series with an adjustable capacitance 16 and an inductance 20. Capacitance 16 is adjusted so that branch 11 is in series resonance at the operating frequency of the oscillator 10. Inductance 20 forms the primary winding of a transformer having two secondary windings, 21 and 22, both connected to inductance 40, but in opposite phases. The secondary windings 21 and 22 are alternately grounded through a single-pole, double-throw relay or switch 24 forming part of an electromechanical chopper mechanism generally shown at 26 and energized from any suitable A.C. source, such as the terminals 28 of an ordinary 60 cycle power supply. As a consequence of the switching action of this electromechanical chopper, the radio frequency signal which is coupled into inductance 40 from the secondary windings 21 and 22 is square wave modulated, as shown in Fig. 2a. During successive half-periods of the modulation cycle, the radio frequency signals are of equal amplitude but opposite phase. The short period of zero amplitude signal corresponds to the period of simultaneous closure of both contacts of switch 24, this switch being preferably of the make-before-break type.

In Figure 1, the branch 12 is connected to the oscillator 10 through a resistance 29 and comprises an inductance 30 in parallel with a variable capacitance 34 and an effective resistance 32. Normally, this branch is adjusted to operate at or near resonance. In the particular application of this invention to the measurement of dielectric constants of fluids, a second capacitance 36 is connected in parallel with capacitance 34 and is held within a chamber or conduit 38 filled with said fluid. This fluid, which may in general be partially conductive, acts as the dielectric between the plates of capacitance 36.

The combined effects of the energy losses in inductance 30 and in the dielectric fluid between the plates of capacitance 36 may be represented by the effective resistance 32, shown in broken lines.

In the parallel resonant branch 12, inductance 30 is magnetically coupled to inductance 40, said inductance 40 being connected in series not only with each of the secondary windings 21 and 22, but also with an adjustable capacitance 42. Capacitance 42 is normally adjusted to resonance with inductances 40 and 21 or 22. Thus, the R.F. signal appearing across capacitance 42 is maximized. This signal is the vector sum of the signals conductively coupled into inductance 40 by the secondaries 21 and 22 and magnetically coupled into inductance 40 by inductance 30. The waveforms in Figures 2b and 2c and the vector diagrams of Figures 3b and 3c show how this vector addition behaves.

Instead of inductance 30 being magnetically coupled to inductance 40 as shown in Figure 1, inductance 30 may be conductively coupled to inductance 40, as will be explained hereinbelow with regard to Figure 4. The term "coupling" therefore is used here and in the claims in a broad sense embracing both magnetic and conductive coupling. It will be apparent to those familiar with the art, moreover, that under certain circumstances, capacitive coupling might also be used and this possibility is not to be regarded as being excluded from the claims since the phase discriminating principle illustrated in Figures 2 and 3 is independent of the particular method of coupling used.

The input of a detector or demodulator 44 is connected to the junction of inductance 40 and capacitance 42, this capacitance being adjusted for series resonance with inductances 40 and 21 (or 22) as previously stated. The output of detector 44 is amplified in amplifier 46 and delivered to the control winding of a two-phase, 60-cycle servo motor 48. This servo motor is connected to the variable capacitance 34 by a mechanical linkage 50 in such a manner as to rebalance the reactance of the system against any disturbance or unbalanced condition brought about, for example, by a change in the dielectric constant of the fluid between the plates of capacitance 36. The recorder 52, actuated by the servo motor through a linkage 53, records the changes in the settings of capacitance 34 and thereby, with proper calibration, indicates the instantaneous value of the dielectric constant of the fluid in chamber 38.

The operation of the present system can be described as follows with reference to the circuit of Figure 1 and the diagrams of Figures 2 and 3:

The oscillator 10 delivers a signal at a suitable radio frequency, for example, 7 megacycles, to the series resonant branch 11 and the parallel resonant branch 12. Since the branch 11 is in series resonance, the phase of the voltage of the signal coupled into inductance 40 by the secondary windings 21 and 22 is alternately 90° in advance of or 90° behind the voltage of the signal supplied to branch 11 by oscillator 10. At the same time, since the branch 12 is at or near parallel resonance, the phase of the voltage of the signal coupled into inductance 40 by inductance 30 is substantially in phase with the voltage of the signal supplied to branch 11 by oscillator 10 and in phase quadrature with the signals from secondary windings 21 and 22. Therefore, the combined signal appearing at the input to the detector or demodulator 44 will be of the form shown diagrammatically in Figures 2b and 2c. The vector diagrams of this signal are shown in Figures 3b and 3c.

The phase comparison principle of the present invention can be explained in terms of the vector diagrams of Figures 3b and 3c, wherein the vectors $E^+$ and $E^-$ represent the two reference signals alternately supplied to the input of detector 44 by the secondary windings 21 and 22. The vector $E_q$ represents the signal supplied to the input of detector 44 by inductance 30. When branch 12 is exactly tuned to parallel resonance (it being assumed that no losses occur in inductance 30), the vector $E_q$ will be in exact quadrature with both $E^+$ and $E^-$ as shown in Figure 3b. Accordingly, if the amplitudes of $E^+$ and $E^-$ are equal, the amplitudes of the resultant signals, $E_r^+$ and $E_r^-$ will be equal as shown in Figure 3b. Furthermore, the demodulated signal appearing at the output of detector 44 will have the form shown in Figure 2b.

When branch 12 is not tuned exactly to parallel resonance, then the vector $E_q$ will make an angle $90°-\theta$ with $E^+$ and an angle $90°+\theta$ with $E^-$ as shown in Figure 3c where $\theta$ represents the angle by which $E_q$ is out of quadrature with the two reference signals, $E^+$ and $E^-$. Since the amplitudes of the resultant signals $E_r^+$ and $E_r^-$ are given by the equations $$E_r^+ = \sqrt{(E^+)^2 + (E_q)^2 + 2E^+ E_q \sin \theta}$$

and $$E_r^- = \sqrt{(E^-)^2 + (E_q)^2 - 2E^- E_q \sin \theta}$$

it is clear that when the angle $\theta$ is not zero, the amplitudes of $E_r^+$ and $E_r^-$ will be unequal. As a result, the demodulated signal appearing at the output of detector 44 will have the form shown in Figure 2c.

From Figure 2b, it can be seen that when branch 12 of Figure 1 is exactly tuned to parallel resonance, the output of detector 44 contains no component of signal at the square wave modulation frequency of 60 cycles per second. But when branch 12 is not tuned to parallel resonance, the output of detector 44, which is of the form shown in Figure 2c, does contain a component of signal at the square wave modulation frequency of 60 cycles per second. Moreover, the amplitude of this 60-cycle component is almost linearly proportional to the R.F. phase angle $\theta$ (over a range of a few degrees) and, provided that the amplitude of the signal $E_q$ is much larger than that of $E^+$ (or $E^-$), the proportionality constant is only negligibly affected by changes in the amplitude of $E_q$. Finally, if the R.F. phase angle $\theta$ changes sign, the phase of the 60 cycle component of the demodulated signal is reversed.

In this manner, the present system is able to discriminate both the magnitude and the direction of a reactive unbalance in branch 12 or a phase unbalance in some similarly connected circuit. It is this direction-sensing feature of the present invention which makes it adaptable for use in a servo-operated, self-balancing device, since any servo motor, such as the two-phase servo motor 48 in Figure 1, requires a direction-sensitive signal to drive it. In the case of the two-phase 60 cycle servo motor 48 in Figure 1, for example, the direction of rotation of its armature depends on the relative phase of the 60 cycle signal fed to the motor from the detector 44 by way of the amplifier 46. Also, the speed of rotation of the armature depends on the amplitude of this same 60 cycle signal.

In the particular application of this invention to the measurement and recording of the dielectric constant of fluids, as depicted generally in Figure 1, any change in dielectric constant of the fluid between the plates of capacitance 36 will change the capacitive reactance of branch 12 and thereby cause a slight change in phase of the R.F. signal $E_q$ of Figure 3. This R.F. phase change will cause a 60 cycle signal to appear at the output of detector 44 as previously explained and the amplifier 46 will then drive the servo motor 48 so as to vary capacitance 34 and finally restore the reactive balance of branch 12. Meanwhile, the recorder 52, which is also linked to servo motor 48, indicates and records the dielectric constant change which has occurred.

Figure 4:
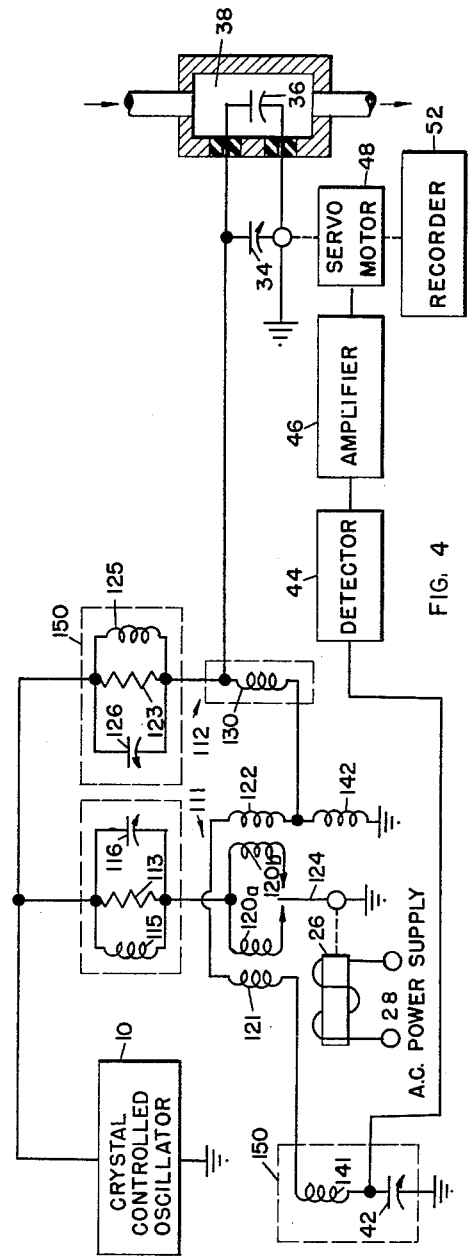
Figure 4 is a circuit diagram of a modification of the circuit of Figure 1.

An alternative arrangement of the present system, which is preferable to that of Figure 1 under certain circumstances, is shown in Figure 4 wherein identical circuit elements are indicated by the same numerals and will not be otherwise described.

The main differences between these two circuits may be summarized as follows:

The resistance 14 and capacitance 16 of branch 11, Figure 1, are replaced by the parallel RLC elements 113, 115, 116 of branch 111, Figure 4. By proper adjustment of capacitance 116, the electrical equivalent of the series combination of resistance 14 and capacitance 16 may be obtained. In branch 111, the primary windings 120a and 120b are alternately grounded by means of switch 124 and these windings are magnetically coupled to the secondary windings 121 and 122.

In branch 112, the parallel RLC elements 123, 125 and 126 are used in place of resistance 29, and capacitance 126 is adjusted so as to make this combination appear as a pure resistance. This modification of Figure 1, in which resistance 29 is an idealized circuit element, is necessary in order to balance out the stray capacitive or inductive reactance of an actual resistor.

Inductance 130, Figure 4, instead of being magnetically coupled to the detector input circuit, is conductively coupled by means of inductance 142. This method of coupling has the advantage of permitting simpler adjustment of the amplitude of the coupled signal. At the frequency of operation used in one embodiment of this circuit (7 megacycles) inductances 120, 121, 122 and 142 may be merely short pieces of wire since the inductance required to produce the desired coupling is very small.

The operation of the circuit of Figure 4 is similar to that already described in connection with the circuit of Figure 1.

It will be clear to those familiar with the art that in the detection and measurement of reactive balance or phase balance in series resonant circuits by the method of this invention, the roles of the series and parallel resonant branches of Figures 1 and 4 may be interchanged without destroying the operation of the phase discriminating system described. Therefore, in the claims, it is to be understood that this invention is not necessarily limited to the detection and measurement of reactive changes in parallel resonant circuits only.

A modification of the circuits of Figures 1 and 4 is shown in Figure 5 wherein identical circuit elements are indicated by the same numerals. This modification is made to permit the demodulated R.F. signal to be further demodulated to a phase-sensitive D.C. signal by the contacts of switch 224. The output of detector 244 is fed to amplifier 246 whose output is of the push-pull type; that is, the output consists of two audio frequency signals of equal amplitude and opposite phase with respect to ground. One way of providing this push-pull output is to use the transformer 245 having a center-tapped secondary winding. The two output signals from transformer 245 are fed to the two contacts of switch 224 through the R.F. filter system composed of inductances 243 and 244 and capacitances 249 and 250. Since the switch 224 applies square wave modulation to the R.F. signals E+ and E− injected into the detector 244, it follows that the audio frequency signals from transformer 245 will be synchronously rectified or detected by this switch. Thus, a D.C. signal appears between ground and the center tap of the secondary winding of transformer 245. When this D.C. signal is made to pass through a D.C. meter, such as millimeter 248, an indication of both the direction and magnitude of the reactive inductance or phase unbalance is obtained. Alternatively, this D.C. signal may be applied to a suitable recorder so that a record of the changes of reactance or phase may be obtained.

I claim as my invention:

1. A phase discriminator circuit comprising two branches having capacitive and inductive elements, means coupled to supply a continuous radio frequency signal to said two branches in parallel, means in the first branch for modulating said radio frequency signal by an audio frequency square wave signal, said two branches being coupled to each other, variable reactance means in said branches for tuning each of said branches to resonance substantially in phase quadrature to each other, measuring means in the second branch responsive to a condition under test for changing the phase angle between the two branches in proportion to said condition, said measuring means being disposed in parallel with the capacitive and inductive elements of said second branch, and a detector connected to receive its input signal from said branches for demodulating said signal and returning said second branch to phase quadrature with said first branch.

2. A phase discriminator circuit comprising two branches having inductive and capacitive elements, means connected to supply a radio frequency signal to said two branches in parallel, means in the first branch for modulating said radio frequency signal by an audio frequency square wave signal, said two branches being coupled to each other, variable reactance means in said branches for tuning each of said branches to resonance substantially in phase quadrature to each other, measuring means in the second branch responsive to a condition under test for changing the phase angle between the two branches in proportion to said condition, said measuring means being disposed in parallel with the inductive and capacitive elements of said second branch, a detector connected to receive its input signal from said branches for demodulating said signal, motor means energized by the output of said detector means and linked to the variable reactance means in the second branch to reset said reactance means in a direction to oppose any change in the resonance state of said branch due to a change in the condition under test, and meter means to record the amount of said reset.

3. The system of claim 1, wherein the modulating means in the first branch comprise a transformer having a plurality of primary and secondary coil means coupled with each other, at least one of said coil means being permanently grounded, and switch means actuated at an audio frequency for alternately inducing oppositely acting electromotive forces in the secondary coil means by alternately grounding through said switch the coil means coupled with the permanently grounded coil means.

4. The system of claim 1, wherein the modulating means in the first branch comprise a transformer having two grounded primary coils and two secondary coils coupled with said primary coils, and means comprising a switch actuated at an audio frequency for alternately inducing oppositely acting electromotive forces in the secondary coil means by alternately grounding said secondary coil means through said switch.

5. The system of claim 1, wherein the measuring means in the second branch is a capacitor having between the plates thereof a fluid whose dielectric constant is to be measured.

6. A phase discriminator circuit comprising two branches coupled to each other, means for supplying a continuous radio frequency signal to said two branches, means in the first branch for modulating said radio frequency, said means comprising a transformer having two primary coils and two secondary coils coupled therewith, said primary coils being grounded, means comprising a switch actuated at an audio frequency for alternately inducing oppositely acting electromotive forces in the secondary coils by alternately grounding said secondary coils through said switch, a detector connected to receive its input signal from said first branch, means for synchronously demodulating the output of said detector, said means comprising a second transformer having its primary connected to the output of said detector and its secondary connected to the secondary coils of said first transformer, and means comprising a meter connected to the midpoint of the secondary of said second transformer for indicating the direction and magnitude of the unbalance of the circuit.

7. A phase discriminating circuit comprising: two parallel reactive circuits; means coupled to supply a continuous radio frequency signal to said two circuits; means coupled to one of said circuits for modulating said radio frequency signal by an audio frequency signal having successive equal periods of opposite phase; first capacitive means in the other of said circuits, said first capacitive means being responsive to a condition under test to change the phase angle between said two circuits in proportion to said condition; second capacitive means disposed in said other circuit in parallel with the first capacitive means and detecting means responsive to said change in phase angle to vary said second capacitive means to oppose any change in the phase angle of said other circuit.

8. A phase discriminating circuit comprising: two parallel reactive circuits; means coupled to supply a continuous radio frequency signal to said two circuits, said circuits being coupled together; means coupled to one of said circuits for modulating said radio frequency signal by an audio frequency signal having successive equal periods of opposite phase; first capacitive means in the other of said circuit, said first capacitive means being responsive to a condition under test to change the phase angle between said two circuits in proportion to said condition; second capacitive means disposed in said other circuit in parallel with said first capacitive means; detecting means responsive to the reactive unbalance of said first and second circuits caused by said phase shift, said detecting means varying said second capacitive means to return said first and second circuits to a balanced condition.

References Cited in the file of this patent

UNITED STATES PATENTS

| | | |
|---|---|---|
| 1,645,618 | Nyquist | Oct. 18, 1927 |
| 2,200,863 | Schuck | May 14, 1940 |
| 2,337,540 | Burgess | Dec. 28, 1943 |
| 2,457,727 | Rifenbergh | Dec. 28, 1948 |
| 2,525,780 | Dennis | Oct. 17, 1950 |
| 2,558,190 | Miller | June 26, 1951 |
| 2,577,668 | Wilmotte | Dec. 4, 1951 |
| 2,617,858 | Brink | Nov. 11, 1952 |
| 2,627,539 | Tompkins | Feb. 3, 1953 |
| 2,693,576 | Koppelmann | Nov. 2, 1954 |

FOREIGN PATENTS

| | | |
|---|---|---|
| 220,553 | Germany | Apr. 2, 1910 |

OTHER REFERENCES

"Electromechanical Phase Indicator" article by S. Wald in Radio and Television News, July 1949, pages 14 and 15.